United States Patent [19]
Abramson

[11] Patent Number: 5,653,367
[45] Date of Patent: Aug. 5, 1997

[54] HOLSTER ARRANGEMENT FOR A TRANSPORTABLE COMMUNICATIONS DEVICE

[76] Inventor: Victor B. Abramson, 632 SE. Peacock La., Portland, Oreg. 97214

[21] Appl. No.: 534,622

[22] Filed: Sep. 27, 1995

[51] Int. Cl.⁶ .................................. A45F 4/00; A45F 5/00
[52] U.S. Cl. .................. 224/581; 224/583; 224/197; 224/624; 224/930; 224/907
[58] Field of Search .................................. 224/930, 907, 224/911, 192, 197, 199, 198, 604, 605, 623, 624, 627, 628, 631, 638, 645, 675, 240, 575, 578, 581, 582, 583, 904

[56] References Cited

U.S. PATENT DOCUMENTS

| | | |
|---|---|---|
| D. 284,807 | 7/1986 | Knight . |
| D. 346,495 | 5/1994 | Morrissey . |
| D. 351,280 | 10/1994 | Pennington . |
| 1,037,717 | 9/1912 | Audley ................................ 224/624 |
| 2,396,118 | 3/1946 | Ohlemeyer ......................... 224/198 |
| 3,583,611 | 6/1971 | Theodore ............................ 224/674 |
| 3,648,906 | 3/1972 | Ross ................................... 224/587 |
| 4,785,983 | 11/1988 | DeSantis ............................. 224/605 |
| 5,269,448 | 12/1993 | Shoemaker .......................... 224/911 |
| 5,358,159 | 10/1994 | Lundie, Jr. . |

FOREIGN PATENT DOCUMENTS 2256700  12/1992  United Kingdom .................. 224/198

Primary Examiner—Linda J. Sholl
Attorney, Agent, or Firm—Robert L. Harrington

[57] ABSTRACT

A holster arrangement for a transportable communications device that is worn by a user and is arranged to have a holder portion positioned on either side of the user's torso. Straps extending from a shoulder pad are utilized to support the holder portion and to secure the holster arrangement to the user. The holder portion is arranged to support a case in varied positions with the case being mountable on the holder portion at a substantially vertical position and at angular positions to the holder portion. Two angular mounting positions are provided to facilitate the use of the holster arrangement when fitted to either side of the user. The case for holding the communications device is readily detached from the holder of the holster arrangement.

1 Claim, 4 Drawing Sheets

HOLSTER ARRANGEMENT FOR A TRANSPORTABLE COMMUNICATIONS DEVICE

FIELD OF THE INVENTION

This invention relates to a holster that is strapped to the body of a user and including a holder portion for removable attachment of a case designed to contain a transportable phone, e.g., a cellular phone.

BACKGROUND OF THE INVENTION

Telephones have rapidly progressed from the conventional wall mounted phone to cordless and car phones and more recently to personal phones. Individuals now carry with them near pocket size cellular phones that have almost limitless range. Cellular phones are common place in restaurants, movie theaters, on the golf course or wherever. The only inconvenience to the individual is having to carry the phone.

Whereas the cellular phone is small in size and light weight, it is not so compact as to comfortably fit a shirt pocket. More likely it is carried in a ladies purse or in a briefcase. However, a purse or briefcase is not always available to the user. When traveling by car the phone may be placed most conveniently on the passenger seat. In a restaurant the phone may be laid on the table. When golfing it may be placed in the golf bag. And on and More recently a special pocket has been developed for the phone in the form of a holster attached to a shoulder harness, the holster being positioned substantially out of the way at the user's side. Such a holster is disclosed in U.S. Pat. No. 5,358,159 issued Oct. 24, 1994.

BRIEF DESCRIPTION OF THE INVENTION

The present invention is an improvement to the holster of the '159 patent. In a preferred embodiment a shoulder harness incorporates a plate-like holder having multiple sets of receiving slots. A case sized to contain a cellular phone is provided with a strap that is selectively insertable and thus removably attachable to a selected one of the multiple sets of receiving slots. The receiving slots are designed to mount the case at different angular positions as may be preferred by different users. For example, a user more interested in comfort than accessibility may want the case mounted in a vertical position and one set of slots will provide vertical mounting. A second user may prefer an angular mounting whereby the phone is more easily removed from the case. A third user may prefer to carry the case angled and at the opposite side. Second and third receiving slot sets will accomplish these alternate mountings.

In any event the case itself is readily detached from the harness in the event the user prefers to place the phone contained in the case in a briefcase or purse, etc. The invention will be more fully appreciated upon reference to the following detailed description and drawings referred to therein.

DESCRIPTION OF THE PREFERRED EMBODIMENT

Figure 1:
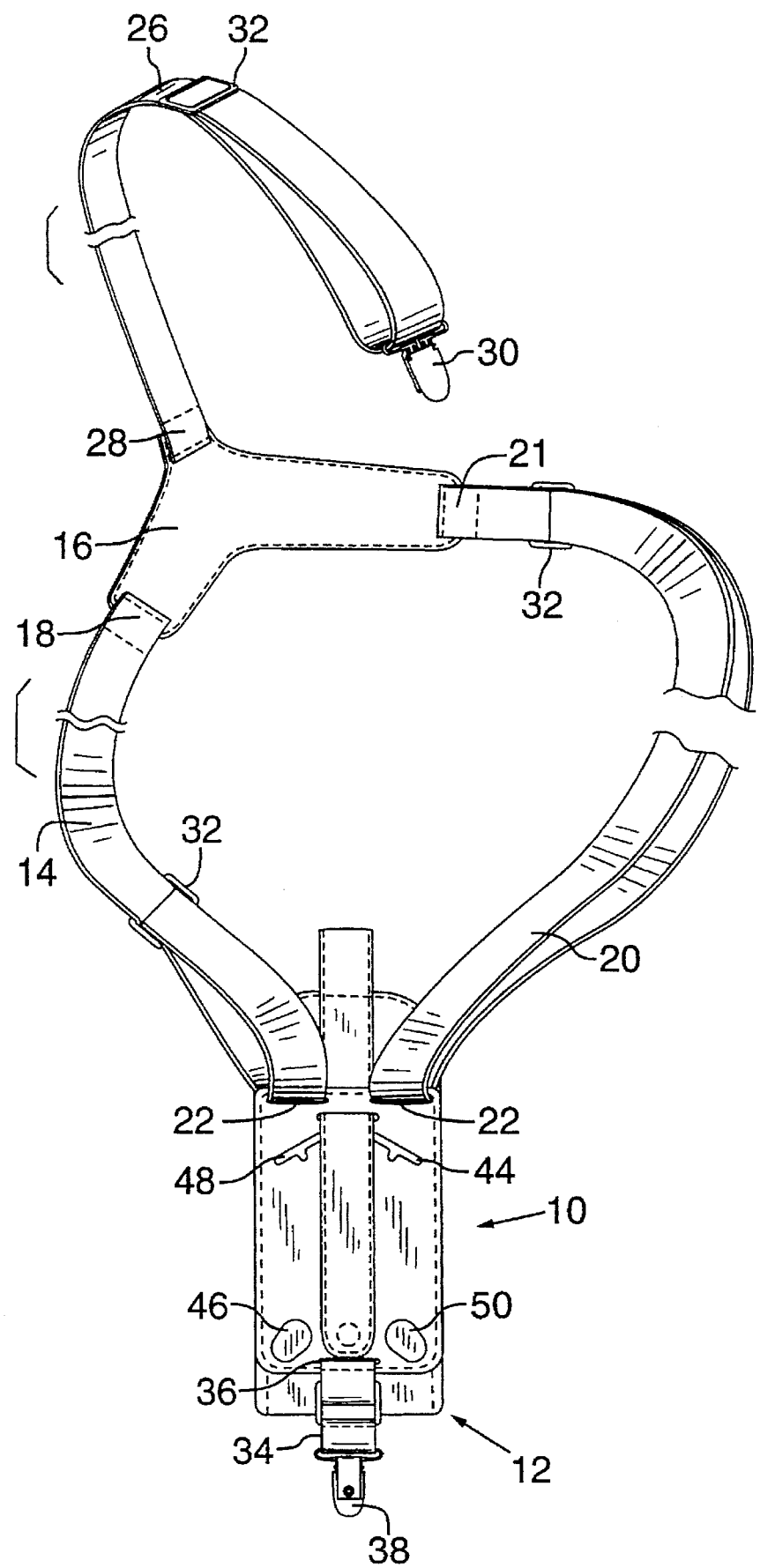
FIG. 1 is a view of a holster arrangement for a transportable communications device of the present invention.
Figure 2:
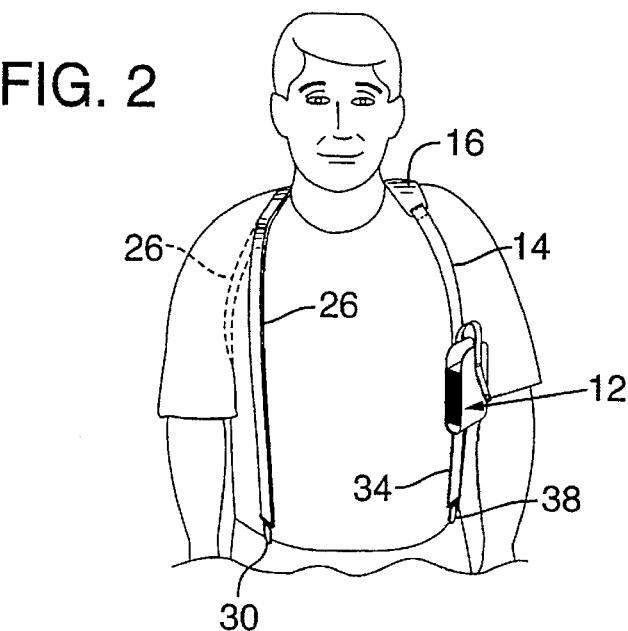
FIG. 2 is a view of the holster arrangement of FIG. 1 fitted on a user.

FIG. 1 illustrates a holster arrangement for a transportable communications device of the present invention. The holster arrangement includes a shoulder harness that is arranged to fitted to a torso of a user as illustrated in FIG. 2 and is suited for having a carrying case situated on either side of the torso of the user. The holster arrangement has a holder 10 to which the case 12 is removably mountable to varied positions as will be later explained.

A belt 14 (strap) extends from the holder 10 and is attached to a shoulder pad 16 at 18. Another belt 20 extends from the holder 10 substantially as shown and is attached to the shoulder pad 16 at 21. Each of the belts 14 and 20 are attached to the holder 10 in an adjustable manner with each of the belts 14 and 20 looped through a corresponding slot 22 in the holder 10. The ends of the belts 14, 20 extending through the slots 22 are attached to an adjusting mechanism 32 (buckle) that is slidably mounted on the portion of the belts (14, 20) extending from the shoulder pad 16 to the holder 10. The length of the belts 14, 20 extending between the pad 16 and the holder 10 may be adjusted by moving the buckle 32 and thus the position of the holder 10 relative to the pad 16 may be adjusted to suit a user. Another belt 26 is attached to the shoulder pad at 28 and the belt 26 has at its opposite end looped through a fastener 30 and attached to an adjuster 32 (buckle). The fastener 30 is suited to attach the belt 26 either to the shoulder pad 16 itself or alternatively to a belt or to the waist line of a garment. The length of the belt 26 may be adjusted for length with the adjuster 32 in the same manner as the belts 14 and 20. A short belt 34 is fitted to the bottom of the holder 10 and is attached to the holder through slot 36 in the holder 10. A fastener 38 is provided on the end of the short belt 34 and is suited for attachment to an item such as a belt or the waist line of a garment.

The holster arrangement of FIG. 1 is fitted to a user as illustrated in FIG. 2. The holster arrangement is fitted to a user with the shoulder pad 16 resting upon either of the shoulders of the user. FIG. 2 illustrates the holster arrangement with the shoulder pad 16 fitted to the left shoulder of the user. The belt 14 will extend down the front of the torso of the user and the belt 20 will fit downwardly from the shoulder along the back and will wrap around the side of the torso. The belts 14 and 20 will cooperatively place the holder 10 and the attached case 12 substantially at the side of the torso of the user in the vicinity of the rib cage. The short belt 34 has its fastener 38 attached to either a belt or the waist line of a garment of the user. The belt 26 is extended across the back of the user and brought forwardly toward the front and may be extended downward to the waist line to attach the belt 26 to a belt or a waistline of a garment by the fastener 30. An alternate arrangement is to extend the belt 26 across the back and toward the front and then around and under the opposite arm pit (as indicated in dashed line) of the user and bring the end of the belt 26 back toward the shoulder pad 16 with the fastener 30 attached to the shoulder pad 16.

The holster arrangement may be utilized such that the holder 10 and the case 12 may be positioned on either side of the torso of the user.

Figure 3:
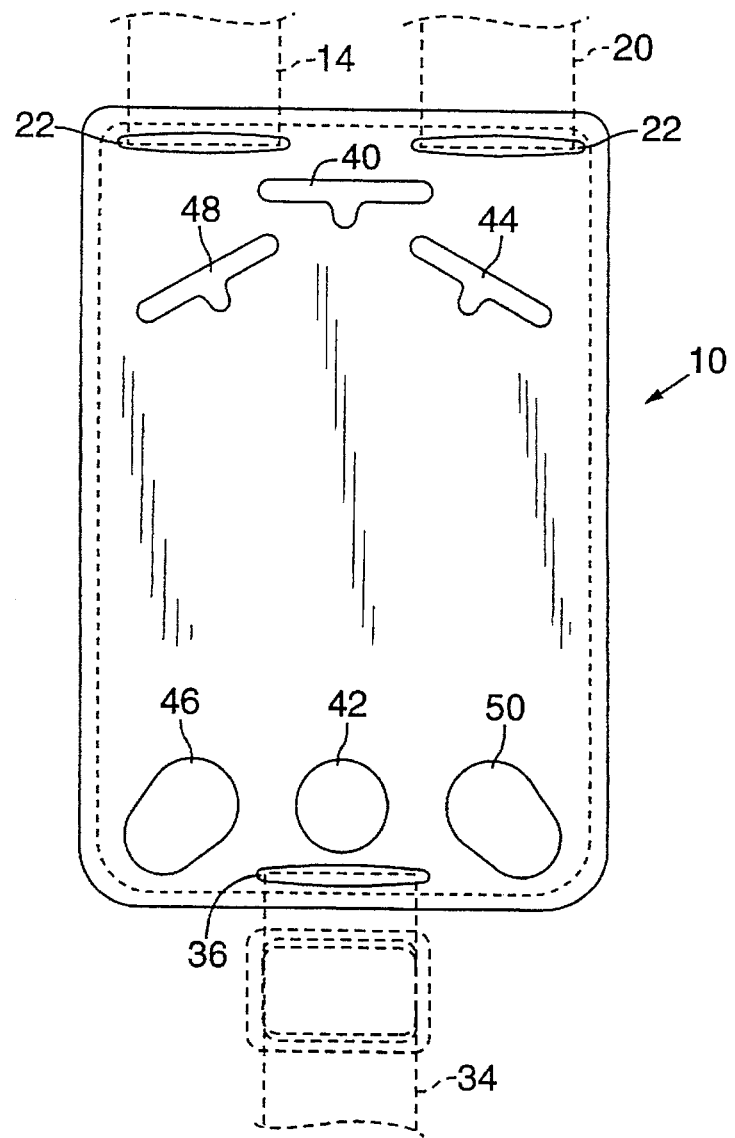
FIG. 3 is a view of a holder portion of the holster arrangement of FIG. 1.

The holder 10 is further illustrated in FIG. 3. The holder 10 is basically a flat semi-rigid material such as leather and is arranged to support the case 12 in varied angular positions relative to holder 10. The holder 10 has slots 22 at an upper portion of the holder 10 for the attachment of the belts 14 and 20. Another slot 36 is positioned at the opposite end for the attachment of the short belt 34. The holder 10 has paired slots 40, 42 arranged for the central mounting of the case 12 on the holder 10. Additionally paired slots 44 and 46 are provided for one angular mounting position of the case 12 and another set of paired slots 48 and 50 are provided for the opposite angular mounting position of the case 12.

Figure 4:
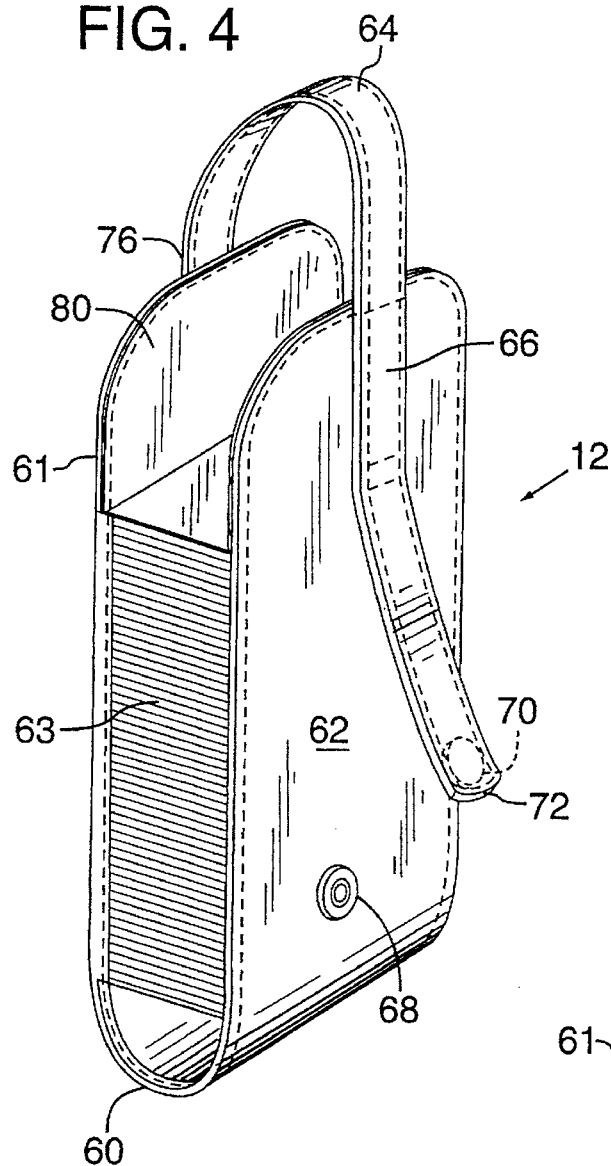
FIG. 4 is a view of a case of the holder arrangement of FIG. 1.

The case 12 is illustrated in FIG. 4. The case 12 is arranged to receive a communication device such as a cellular phone and it will be appreciated that the case 12 will be sized to suit the size of the communication device. The case 12 is fabricated of a material similar to that of the holder 10 and as shown the body 60 of the case 12 is formed into somewhat of a U shape to form a bottom and sides 61, 62. The case 12 has pliable ends 63 attached to the sides 61, 62 that allow the body 60 to expand and contract to accommodate the size of the communication device. A strap 64 is fixedly attached to side 62 of the body 60 at 66 and as shown the strap 64 extends on either side of the point of attachment 66. A fastener 70, such as a snap, is provided near end 72 of the strap 64 and a corresponding mating receptacle 68 for the snap 70, is fixedly attached to the side 62 of the body 60 strategic to the snap 70. The opposite end 76 of the strap 64 loops over the body 60 and is attachable to the side 61 of the body 60 by self-adhering fasteners such as VELCRO. The VELCRO fasteners are attached to the side 61 and the end 76 of the strap 64 in a conventional manner.

The end 76 of the strap 64 secured to the side 61 of the body 60 by the self-adhering fasteners will thus secure a communication device within the case 12. To insert a communication device, the end 76 of the strap 64 is detached from the side 61 of the body 60 permitting the insertion or removal of the communication device through the top portion 80 of the case 12 and thus defines a pathway for the insertion and removal of the communication device. When a communication device is inserted into the case 12, the communications device is secured within the cavity of the case 12, the cavity being defined by the bottom and the sides 61, 62 of the body portion 60 and the side walls 62 with the top opening 80 being secured by the end 76 of the strap 64 being attached to the side 61 of the body 60 of the case 12.

Figure 5:
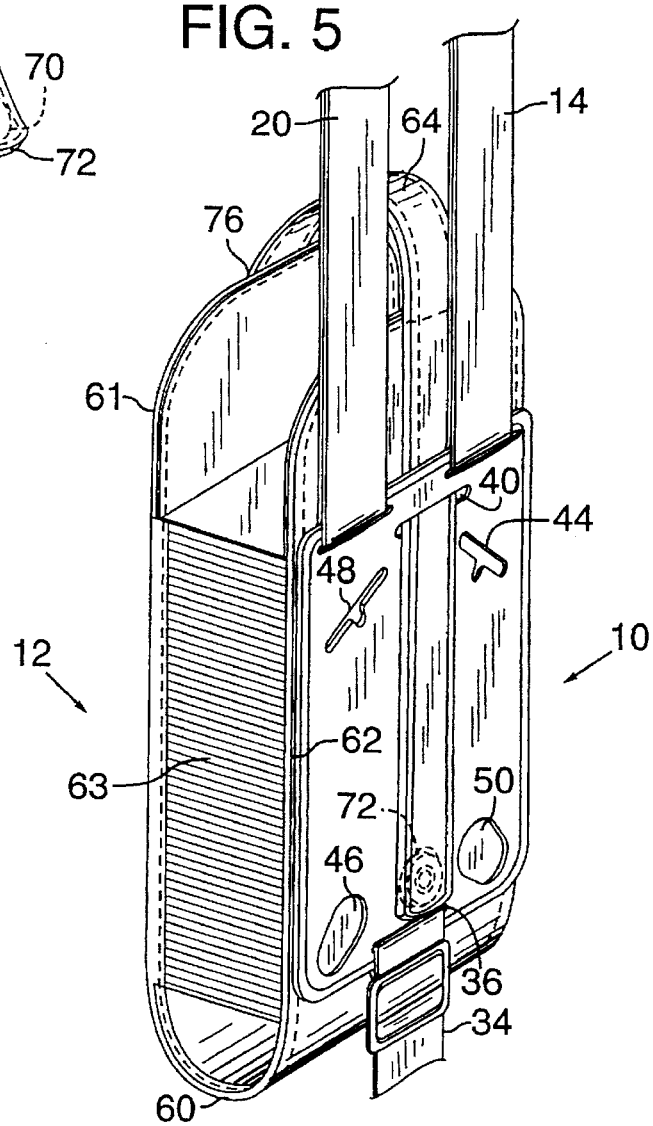
FIG. 5 is a view showing the case of FIG. 4 mounted in one of the alternative positions on the holder of FIG. 3.

FIG. 5 illustrates one mounting position for mounting the case 12 to the holder 10. As shown, the case 12 is placed adjacent to the holder 10 with the end 72 of the strap being inserted through the slot 40 and extending downwardly toward the slot 42 with the receptacle 68 attached to the case 12 extending into the slot 42. Snap 70 on the strap 64 is fitted to the receptacle 68 to thus secure the case 12 to the holder 10. This mounting position will position the case 12 in a substantially vertical position when the holster arrangement of FIG. 1 is fitted to a user as shown in FIG. 2.

Figure 6A:
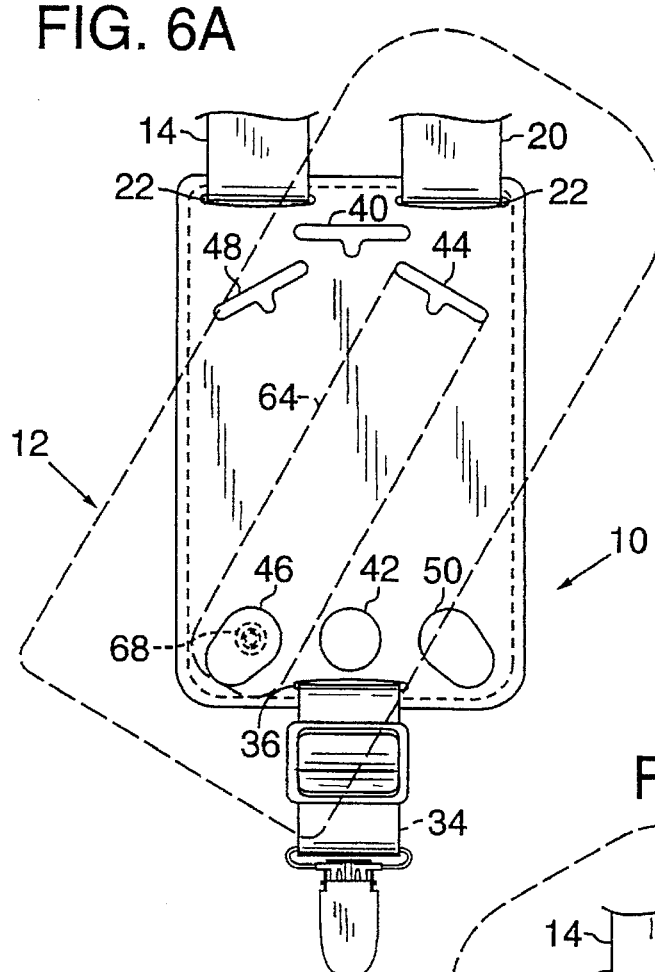
FIGS. 6A and 6B illustrate the other alternative mounting positions of the case of FIG. 4 on the holder of FIG. 3.
Figure 6B:
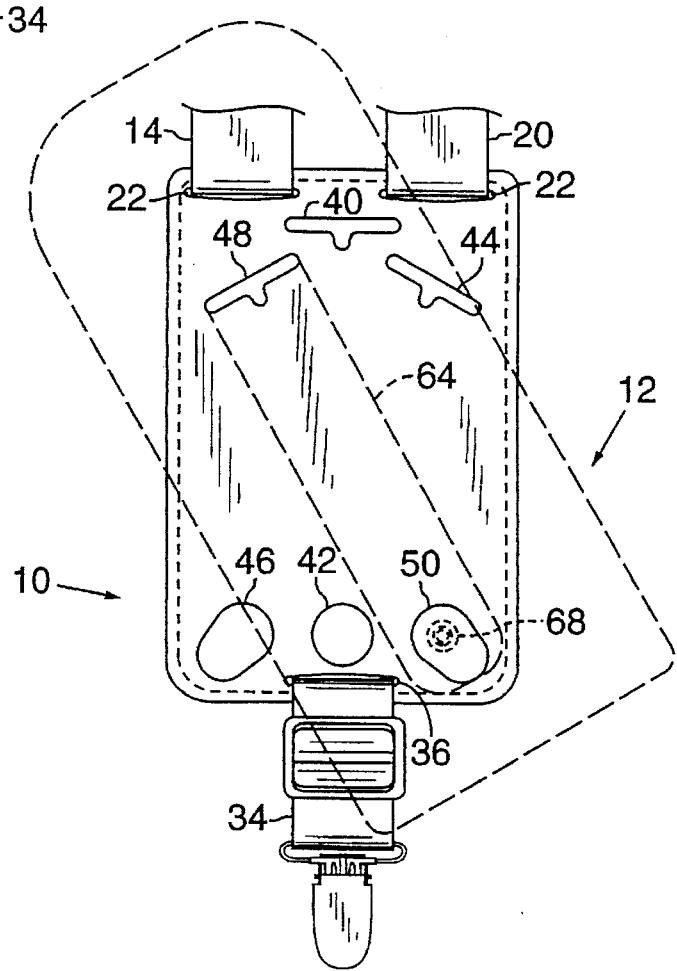

FIGS. 6A and 6B illustrate the alternate mounting positions of the case 12 to the holder 10. In FIG. 6A, the end 72 of the strap 64 is inserted into the slot 44 and is extended down to the slot 46. The receptacle 68 of the case 12 will be received in the slot 46 and the snap 70 is secured to the receptacle 68 to thus secure the case 12 to the holder 10. As shown in FIG. 6A, the case 12 is mounted at an angle to the holder 10 and thus when the holster arrangement is fitted to a user, the case 12 will be at an angle rather than in a vertical position. FIG. 6B illustrates the alternate angular mounting arrangement of the case 12 to the holder 10. In FIG. 6B the end 72 of the strap 64 will be inserted through the slot 48 and will be extended down to the slot 50. The receptacle 68 of the case 12 will be received in slot 50 and the case 12 is secured to the holder 10 by the snap 70 being secured to the receptacle 68.

The case 12 may thus be mounted centrally on the holder 10 (referred to as a vertical position) as illustrated in FIG. 5 and may be mounted to the holder 10 at an angular position as indicated in FIGS. 6A and 6B. The angular mounting position of the case 12 on the holder 10 is believed to make the communication device contained within the case 12 more accessible. One angular mounting position would be utilized when the holder 10 is positioned on the left side of the individual and the opposite angular mounting position would be utilized when the holder 10 is positioned on the right side of the individual.

Those skilled in the art will appreciate that modifications and variations may be made without departing from the true spirit and scope of the invention. The invention is therefore not to be determined from the embodiments described and illustrated but is to be determined from the appended claims.

I claim:

1. A holster arrangement for a transportable communications device comprising:

a shoulder harness fitting the upper torso of a user and a holder portion carried by the harness and positioned at a side of the user with the harness fitted to the user;

a case including a device containment cavity and including an opening through which a communications device is slidably inserted into and removed from the containment cavity and defining thereby a pathway along which the device is moved in inserting and removing said device from said case; said holder portion is provided with multiple sets of receiving slots and said case is provided with a strap configured to fit and secure the case to any one of the sets of receiving slots whereby a user can angularly vary the direction of the pathway for inserting and removing said device from said case; and the holder portion is a plate like flexible material and each set of slots includes an upper and lower opening at spaced apart and opposed positions in the holder portion, each set of slots defining a different angular position, and said strap including an upper and lower end portion, the upper end portion permanently attached to the case, said strap being flexible and including mated fasteners at its lower end portion and on the case for fastening the lower end portion to the case, said lower end portion insertable through any upper opening of a set of slots and the fastener of said case exposed through the exposed lower opening for attachment of the strap lower end to the case.

* * * * *